Nov. 18, 1952   H. A. PELLER   2,618,507
SIDE DUMP VEHICLE
Filed Dec. 28, 1948   4 Sheets-Sheet 1
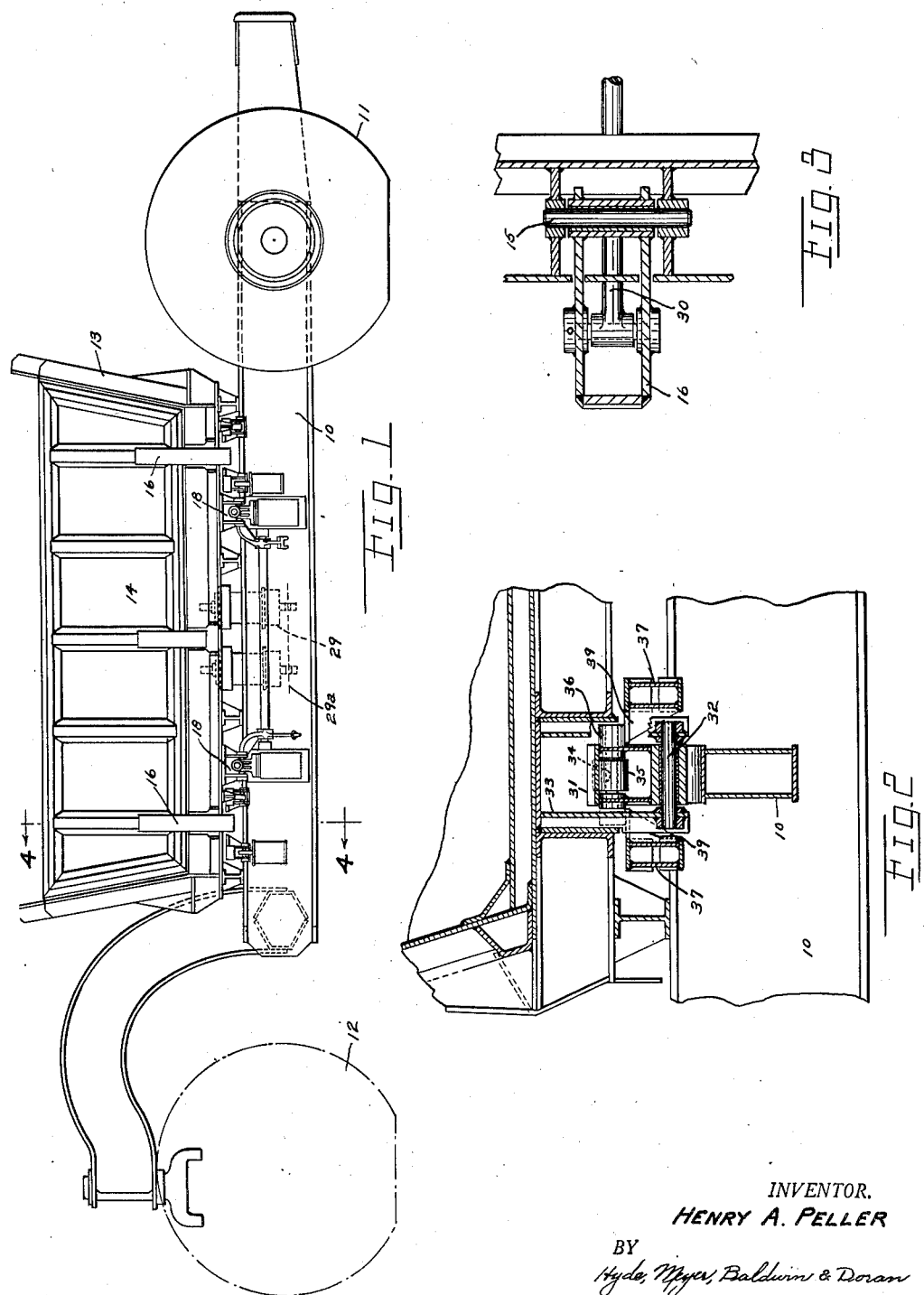
INVENTOR.
HENRY A. PELLER
BY
Hyde, Myer, Baldwin & Doran
ATTORNEYS Nov. 18, 1952     H. A. PELLER     2,618,507
SIDE DUMP VEHICLE Filed Dec. 28, 1948     4 Sheets-Sheet 2

INVENTOR.
HENRY A. PELLER
BY
Hyde, Meyer, Baldwin & Doran
ATTORNEYS

Nov. 18, 1952  H. A. PELLER  2,618,507
SIDE DUMP VEHICLE
Filed Dec. 28, 1948  4 Sheets-Sheet 4

INVENTOR.
HENRY A. PELLER
BY
Hyde, Meyer, Baldwin & Doran
ATTORNEYS

Patented Nov. 18, 1952

2,618,507

UNITED STATES PATENT OFFICE 2,618,507

SIDE DUMP VEHICLE

Henry A. Peller, Euclid, Ohio, assignor to The Euclid Road Machinery Co., Cleveland, Ohio, a corporation of Ohio Application December 28, 1948, Serial No. 67,634

2 Claims. (Cl. 298—18)

This invention relates to side dump load carrying vehicles, and more particularly to the means and mechanism for selecting the direction of dump and for controlling the doors to open only that door or doors on the dumping side of the body.

One object of the invention is to provide simple, efficient, and otherwise improved mechanism for controlling operation of either the hopper body, or the doors, or both, and in which such mechanism is attached to or is carried by and as a part of the body, rather than the vehicle frame.

A further object is to provide improved door operating mechanism including a link and a roller carrying bell crank which are connected as a self contained unit and form part of the load carrying body.

Another object is to provide improved door operating mechanism actuated by tilting motion of the body and so arranged as to cause rapid door opening motion in comparison with the body tilting motion to which it responds.

Still another object is to provide improved body tilting and door opening mechanism which includes simplified means of adjustment and positive stop means for limiting motion of the parts.

A further object is to insure positive locking of the door in inoperative position on the raised side of the body to prevent any possibility of loss of load or of injury to either the door mechanism or operator by undesired door opening movement.

Another object is to provide improved door operating mechanism including self regulating pick up links or levers operative selectively or alternately according to the direction of body tilt.

Further objects of the invention in part are obvious and in part will appear more in detail hereinafter.

In the drawings, which represent one suitable embodiment of the invention, Fig. 1 is a side elevation;

Fig. 2 is a detail sectional elevation on the line 2—2, Fig. 4;

Fig. 3 is a sectional plan view on the line 3—3, Fig. 4;

Figure 4:
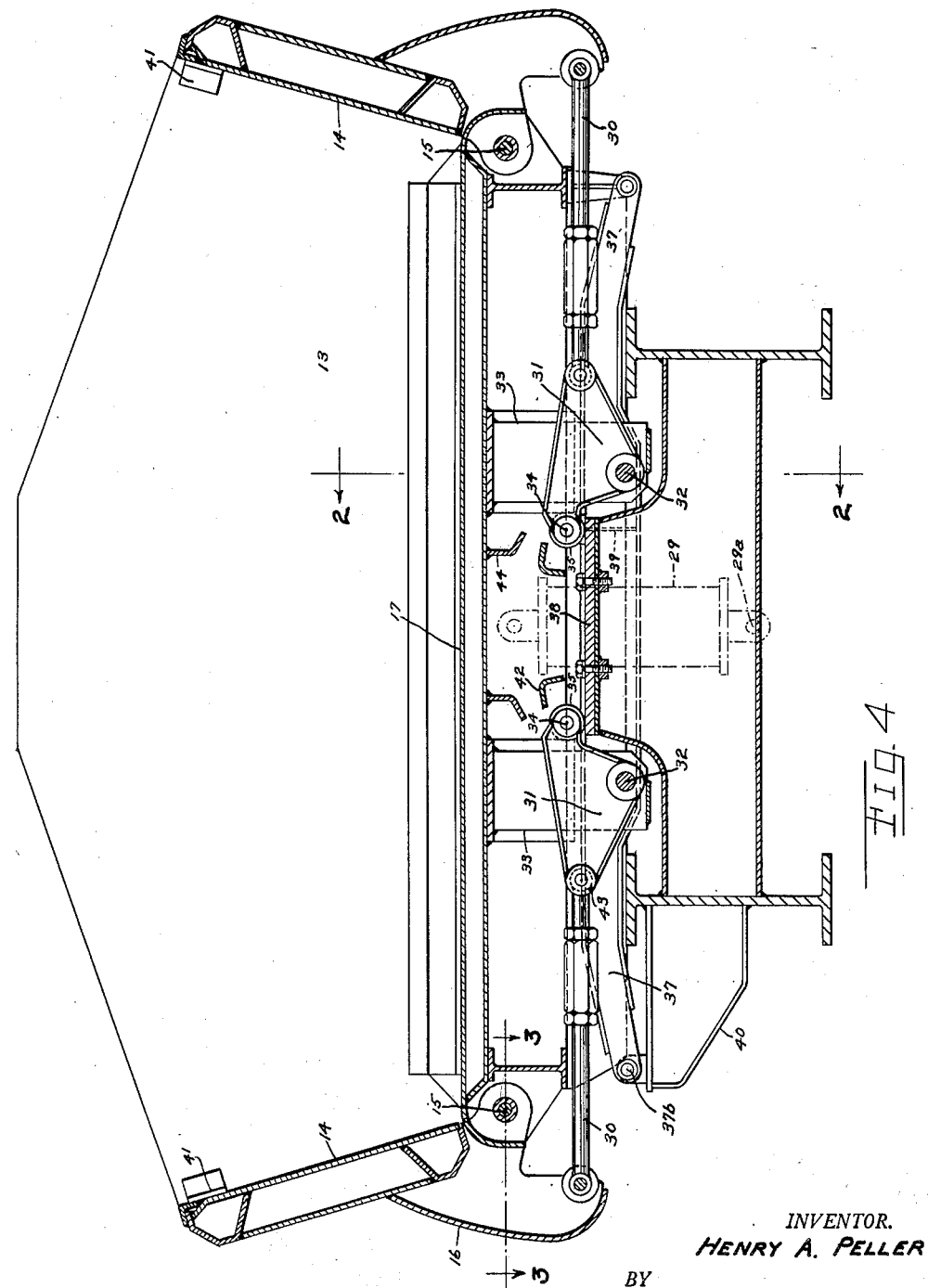
Fig. 4 is a cross section, on a larger scale, on the line 4—4, Fig. 1, showing the body in lowered position.

While the invention may be applied to any form or arrangement of load carrying vehicle, for purposes of illustration and in no sense of limitation the drawings show it applied to a trailer illustrated somewhat conventionally as comprising a main supporting frame 10, the rear end portion of which is supported upon wheels 11 and the front end of which is carried by the wheel or wheels 12 of a tractor (not shown). On the frame is mounted a load carrying hopper body 13 of suitable size, shape and proportions, open at its top and provided on each side with one or more swinging doors or gates 14 mounted to turn on horizontal hinge pins 15 extending along the lower edges of the doors and each protected by a depending shield or guard 16 attached to and movable with the door.

The hopper body includes a frame 17 provided at each side with two or more sets of depending brackets 18, each set supporting a hinge pin 19 (four in all in the form shown) designed to rest in the upwardly opening seat or recess 20 of a cradle member 21 rigidly secured to the main supporting frame 10. The cradles on opposite sides of the frame are alined, in pairs, and each pair of two cooperates with a heavy transversely extending slidable locking bar 22 operatable, to slide it, by yoke 23 on an arm 24 mounted upon a longitudinally extending shaft 25 having an operating handle 26. Shaft 25, of course carries two arms 24, so that handle 26 operates both bars 22. A third arm 27 supports a snap action biasing spring and plunger, marked generally 28, (Fig. 7), of well known form and so arranged as to bias handle 26 and the bars 22 to either of two extreme positions. Bars 22 are of such length that in one of these positions the pivot pins 19 on one side of the body are locked in their seats and those on the other side are released, and vice versa in the other position.

The hopper body is elevated at the will of the operator by supplying fluid pressure to servo motors 29 pivotally mounted at 29a along the center line of the main frame and piston rod connected to the body frame.

Thus, when these servomotors are operated the body is elevated and tilted toward one side or the other, according to which sets of pivots 19 are locked and which are released. Direction of tilt is selected by appropriately positioning handle 26 before elevating the body.

Figure 7:
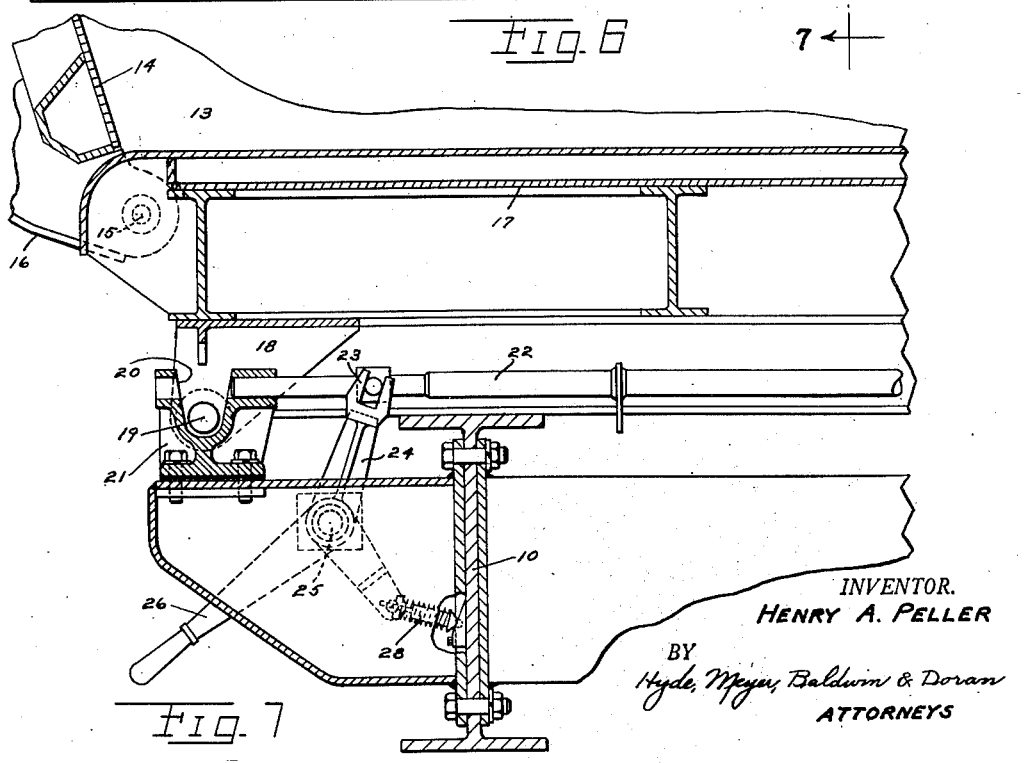
Fig. 7 is a sectional elevation on the line 7—7, Fig. 6.

Fig. 7 illustrates one end of one of the bars 22 in retracted or release position. By endwise motion to the left it may be advanced to locking position over pin 19.

The mechanism also includes the necessary parts for controlling door operation. Each single side door on the vehicle shown, when the body is in lowered or horizontal position, as in Fig. 4, occupies a position with its center of gravity above, but outwardly beyond its pivot pins 15, so that by gravity it tends to swing open. It is restrained from so moving by two link members 30, each of turnbuckle form and thus adjustable as to length, pivotally connected at one end to the lower end of depending guard 16 and at its opposite end to a bell crank lever 31 pivoted at 32 on a bracket 33 attached to and depending from the body frame 17. Bell crank lever 31 is of hollow boxlike form (see Fig. 2). The second arm of bell crank 31 supports a pin 34 provided between its ends, and between the parallel walls of the box, with a roller 35 and at one end with a projective boss 36. Considering two of these devices on opposite sides of the vehicle, the end boss 36 on pin 34 on one side is on the forward end of the pin and on the other side is on the rear end of the pin (see dotted lines, Fig. 2). This is because these bosses 36 cooperate with two elongated parallel pickup bars 37 one fore and other aft of levers 31.

Figure 5:
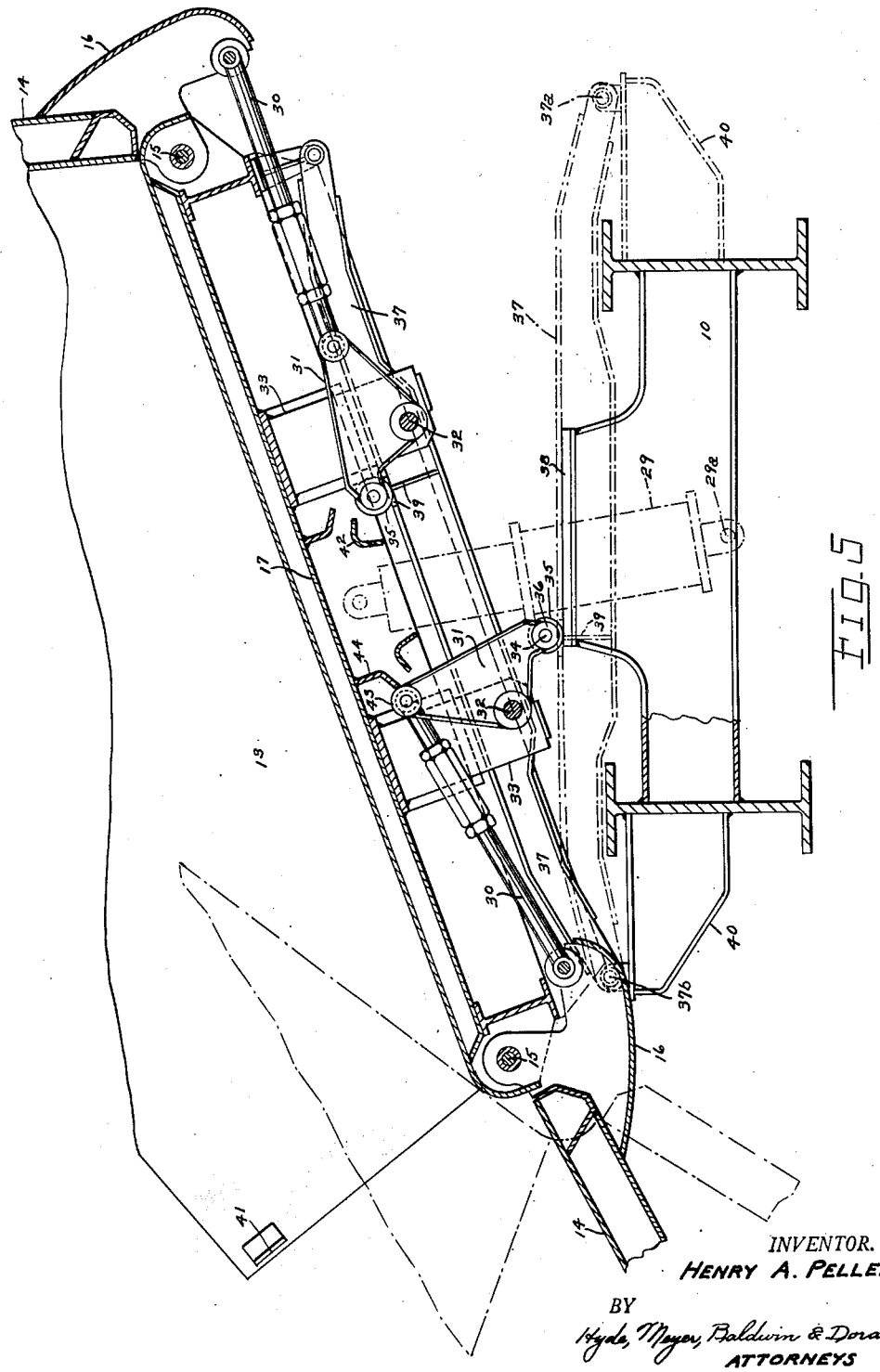
Fig. 5 is a similar view showing the body in elevated or tilted position.
Figure 6:
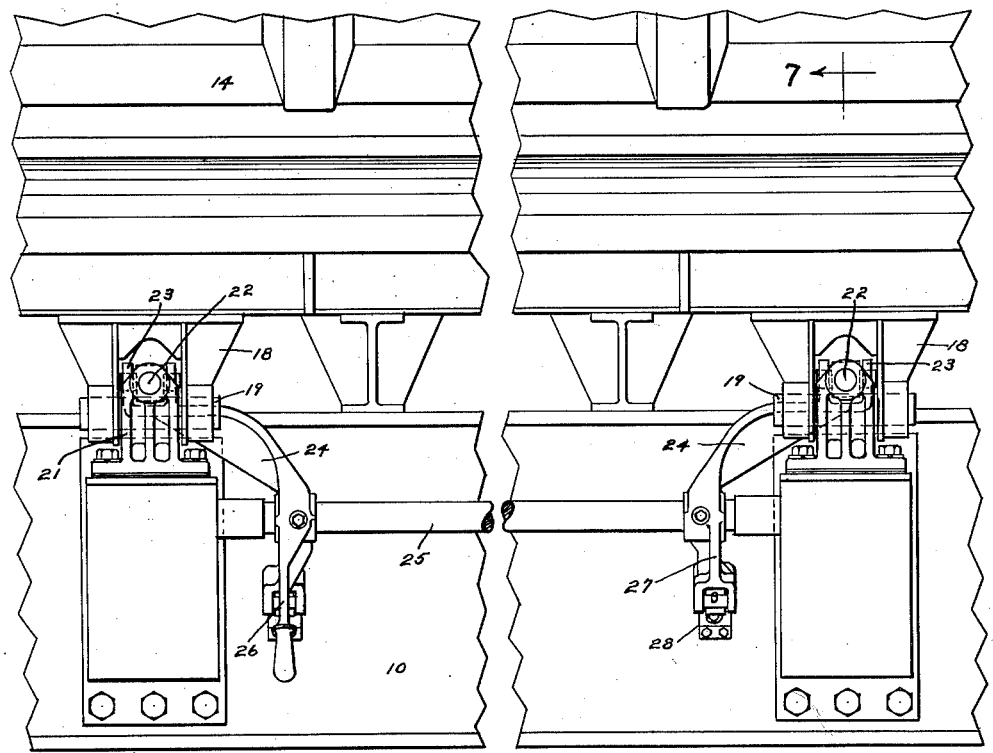
Fig. 6 is a detail side elevation on a larger scale.

The two rollers 35 ride on a fixed track or support 38 mounted on the main frame 10 (Fig. 5).

The two bosses 36 each lie over and rest upon the shelf portion of a bracket 39 fixed to one side of one of the bars 37, one boss over one shelf, and the other boss over the other shelf.

One of the bars 37 is shown in dot dash lines, Fig. 5. It is pivoted at its right hand end at 37a to a bracket 40 on frame 10. The other bar 37 (shown in full lines and tilted or elevated in Fig. 5) is pivoted at its left hand end at 37b to a similar bracket 40 on frame 10. The right-hand end of bar 37 in full lines in Fig. 5 is pivoted to a bracket fixed on body frame 17 as clearly shown. Therefore, this bar 37 is lifted when the body tilts toward the left as shown in Fig. 5 and holds the upper door 14 closed. The dot-dash bar 37 (as seen in Fig. 5) is fixed to frame 17 at the left-hand side and holds the left-hand door closed when the body tilts toward the right.

The operation is as follows:

Let us assume that the vehicle body is filled with a load and that the hopper body accordingly, as well as other parts, is in the position shown in Figs. 4 and 7. Let us further assume that it is desired to dump the body to the left of the vehicle, looking at Fig. 4.

The operator first grasps the handle 26, Fig. 7 and depresses it, turning shaft 25 and throwing arms 24 over to their other extreme positions, thus advancing the left-hand end of the locking bars 22 into locking position above the pivots 19 on the left-hand side of the vehicle, and at the same time retracting to release position (shown in Fig. 7) the opposite ends of said rods. The hopper body thus can tilt only toward the left. It should be noted that this manual operation of rods 22 produces no operation or immediate effect upon any of the door controlling or operating mechanism or parts.

Next, the operator actuates the valve (not shown) to cause the supply of fluid pressure to the servo motors 29, the pistons and rods of which rise and elevate the body, tilting it to the left, until it reaches the position shown in Fig. 5.

Considering first the door 14 at the right, Fig. 5, that door is firmly held or locked closed, as the body rises, because of the same mechanism which holds all doors closed when the body is in horizontal position. When the body rises one each of the two pairs of transverse bars 37 (those shown in full lines, Fig. 5) rises or tilts with the body and its frame, turning about the left-hand pivots 37b to do so. The end bosses 36 on the levers 31 for the right-hand doors are supported by and rest upon the shelves of brackets 39, and these shelves take the thrust of the weight of the doors when the centers of gravity thereof are outwardly beyond the pivots 15. As the center of gravity of the doors passes inwardly beyond pivots 15, inward door motion is prevented by stops 41, Fig. 4. In other words, as the hopper body and its frame rise, in the example under discussion, the parts of the right-hand door control mechanism remain in situ and move as a unit with the hopper body and its frame.

At the left-hand side of the vehicle, however, the situation is different. Here, the body swings about its pivots 19, to which it is locked, and the second set of bars 37 (shown in dot-dash lines, Fig. 5) stays put, without motion and does not rise. Thus, support for the bosses 36 of the left-hand set remains stationary. As the body rises, the door opens and, through links 30, swings the left-hand bell crank levers 31 clockwise about their pivots 32 until the parts reach the position shown in Fig. 5. During travel of the parts from the Fig. 4 to the Fig. 5 position the rollers 35 travel first a short distance to the right and then back again toward the left on their tracks 38.

Motion of the door thus opening is very rapid as compared with motion of the hopper body as a whole. For example, the door 14 is completely opened, turning through approximately seventy-five degrees, during the first sixteen degrees of swinging elevating motion of the hopper body as a whole.

As the body rises more and more the load begins to slide out until, when sufficient slope is secured, all load is ejected, sliding out over the now downwardly sloping door and relieving the vehicle body entirely of its load.

Tilting to about sixteen degrees, as shown in Fig. 5 where the door is completely opened, may be sufficient to accomplish this. In that position the rollers 35 still rest upon their supports 38 and further door opening movement is prevented by engagement of bell crank 31 with stationary stops 42, 44. However, in some cases, as when the load is particularly sticky, it may be desirable to tilt the door still farther. This may be accomplished by further extension of the pistons and rods of the servo motors until the body and door reach the positions shown in dot-dash lines, Fig. 5, with a tilt of from fifty to sixty degrees or more. During this additional tilt, the levers 31 and links 30 of the tilted door travel up with the hopper body and its frame, but without further tilt of the door with respect to the body, rollers 35 rising from their supports 38 for this purpose. Such motion is permitted because pins 19, Fig. 7, and 37b, Fig. 5, on the same side of the body, are coaxially related.

Evacuation of the servo motors 29 permits the body to return to its original position by gravity, with opposite motion of the open door to closed door position, leaving the vehicle in proper condition to receive another load, which may be dumped to either side by proper selection of the pivot pins 19 to be locked, as the case may be.

The invention described is an improved mechanism of comparatively simple construction, but which nevertheless is sturdy, strong, and highly satisfactory for the purpose. Operation of a single lever 26 enables the operator, when the vehicle stops, to select or determine the direction of dump, either to one side or the other. Then, without further attention on the part of the operator, actuation of the servo motors tilts the body and automatically opens the appropriate door and dumps the load at the selected side. At the same time the other door is locked in a position from which it cannot escape. Evacuation of the servo motor returns all parts to their original positions ready for another operation. All of the door operating and control mechanism is connected to and unitary with the hopper and its body, leaving out of consideration those links 37 for door rise when the body is tilted, and even these are connected to the main frame only by simple pivots. The pivot locking mechanism however is entirely carried and supported by the main frame. Thus, any given style of main frame and wheels may be assembled with various styles, sizes or proportions of body and doors, without interference of either by the other. Further advantages will be apparent to those skilled in the art.

What I claim is:

1. A side dump vehicle, comprising a frame, a hopper body pivotally mounted thereon to tilt selectively about either of two longitudinal axes along the sides of the body, means for so tilting the body, two normally closed side gates each hinged along its lower edge to one side of the body, two sets of link and lever mechanism, one for each gate, for causing gate opening movement as the body tilts, and two bars pivoted upon the frame, one each on the two axes of tilt of the body, and each bar extending across the frame and connected to the opposite side of the body, each bar lying beneath one of the sets of mechanism, the bar pivoted to the frame on the side toward which the body tilts being lifted by the opposite side of the body as it tilts, whereby to lift its associated set of mechanism and lock the door on the upper side of said body.

2. The combination of claim 1 wherein each set of link and lever mechanism comprises a link pivotally connected to its associated gate, a lever pivoted to the body and having two arms one connected to the link and the other having a roller traveling on a portion of the frame, a boss coaxial with said roller, and a shelf portion rigid with each of said bars and adapted to engage beneath its associated boss to lift the associated link and lever mechanism controlling the door on the high side of said body to hold said door on the high side closed as the body tilts about its low side.

HENRY A. PELLER.

REFERENCES CITED

The following references are of record in the file of this patent:

UNITED STATES PATENTS

| Number | Name | Date |
|---|---|---|
| 1,611,012 | Flowers | Dec. 14, 1926 |
| 1,813,570 | Flowers | July 7, 1931 |
| 1,909,341 | Galanot | May 16, 1933 |
| 1,909,969 | Kuchar | May 23, 1933 |
| 1,909,970 | Kuchar | May 23, 1933 |
| 1,834,426 | Schmohl et al. | Dec. 1, 1933 |
| 1,972,042 | Flowers | Aug. 28, 1934 |
| 1,977,819 | Burner | Oct. 23, 1934 |
| 2,189,336 | Anderson | Feb. 6, 1940 |